(12) United States Patent
Suhane et al.

(10) Patent No.: US 12,316,623 B2
(45) Date of Patent: May 27, 2025

(54) VERIFYING THE AUTHENTICITY OF INTERNET KEY EXCHANGE MESSAGES IN A VIRTUAL PRIVATE NETWORK

(71) Applicant: HEWLETT PACKARD ENTERPRISE DEVELOPMENT LP, Spring, TX (US)

(72) Inventors: Ravi Suhane, Bangalore (IN); Amit Agrawal, Bangalore (IN); Nagendra Babu Rapaka, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 121 days.

(21) Appl. No.: 18/314,436

(22) Filed: May 9, 2023

(65) Prior Publication Data

US 2024/0283776 A1    Aug. 22, 2024

(30) Foreign Application Priority Data

Feb. 22, 2023   (IN) .............................. 202341012031

(51) Int. Cl.
| | | |
|---|---|---|
| *H04L 29/06* | (2006.01) | |
| *H04L 9/08* | (2006.01) | |
| *H04L 9/30* | (2006.01) | |
| *H04L 9/32* | (2006.01) | |
| *H04L 9/40* | (2022.01) | |

(52) U.S. Cl.
CPC ........ *H04L 63/0823* (2013.01); *H04L 9/0819* (2013.01); *H04L 9/3073* (2013.01); *H04L 9/3268* (2013.01); *H04L 63/0272* (2013.01); *H04L 63/0485* (2013.01); *H04L 63/123* (2013.01); *H04L 63/166* (2013.01)

(58) Field of Classification Search
CPC .................................................. H04L 63/0823
See application file for complete search history.

(56) References Cited

U.S. PATENT DOCUMENTS

| | | | |
|---|---|---|---|
| 8,738,897 B2 | 5/2014 | Mukkara | |
| 9,350,708 B2 | 5/2016 | Wong et al. | |
| 10,149,166 B2 | 12/2018 | Mazzuca et al. | |
| 10,270,603 B2 | 4/2019 | Yang et al. | |
| 2003/0145227 A1* | 7/2003 | Boden ................... | H04L 63/061 713/171 |
| 2009/0041006 A1* | 2/2009 | Chiu ................... | H04L 63/0428 370/352 |

(Continued)

*Primary Examiner* — Bradley W Holder
(74) *Attorney, Agent, or Firm* — Hewlett Packard Enterprise Patent Department (57) ABSTRACT

Some examples relate to a verifying the authenticity of IKE exchange messages in a VPN. In an example, a VPN client sends a VPN server profile request message to a VPN server for establishing a VPN connection. In response, the VPN server provides a VPN server profile to the VPN client. The VPN server profile comprises a cryptographic public key associated with a server certificate of the VPN server. The VPN client stores the VPN server profile and sends an IKE message to the VPN server. In response to the IKE message, the VPN server sends a signed IKE response message. Upon receipt, the VPN client verifies the authenticity of the signed IKE response message. If the signed IKE message is successfully verified, the VPN client sends an identity of the VPN client to the VPN server.

19 Claims, 6 Drawing Sheets

(56) References Cited

U.S. PATENT DOCUMENTS

2016/0191478 A1\* 6/2016 Pruss ................ H04W 12/0471
                                                                            713/171
2016/0285627 A1\* 9/2016 Sedlacek ................. H04L 69/28
2020/0320199 A1 10/2020 Sheth et al.

\* cited by examiner

VERIFYING THE AUTHENTICITY OF INTERNET KEY EXCHANGE MESSAGES IN A VIRTUAL PRIVATE NETWORK

BACKGROUND

A virtual private network (VPN) is a private network that uses a public network to connect two or more remote sites. Instead of using dedicated connections between networks, VPNs use virtual connections routed through public networks. The benefits of a VPN include increases in functionality, security, and management of the private network.

BRIEF DESCRIPTION OF THE DRAWINGS

For a better understanding of the solution, examples will now be described, with reference to the accompanying drawings, in which.

DETAILED DESCRIPTION

A "virtual private network" (VPN) refers to a private network connection that is built over a public network infrastructure such as the internet. A VPN connection can link, for example, a remote user and a local area network (LAN). The traffic that flows between these two points can pass through shared resources such as routers, switches, and other network equipment that make up a public wide area network (WAN) such as the internet. A VPN provides access to resources that are inaccessible on the public network. A VPN can be used, for example, for remote workers to connect to a corporate network.

To secure VPN communication while passing through the WAN, a virtual private network client (VPN client) uses an authentication method to connect with a virtual private network server (VPN server). As used herein, the term "VPN client" refers to an end device or software that is seeking connection, network, or data services from a VPN. A VPN client is part of the VPN infrastructure and is the end recipient of VPN services. As used herein, a "VPN server" refers to a type of server that enables the hosting and delivery of VPN services. A VPN server establishes a secure connection between a VPN client and networks, such as an intranet.

In an implementation, a pre-shared key (PSK) is used as an authentication method between a VPN client and a VPN server. As used herein, a "pre-shared key" is a secret string of characters in cryptography that is shared between two parties using a secure channel before the PSK is used. A PSK can be shared between a VPN client and a VPN server via a secure channel (e.g., a Transport Layer Security (TLS) channel) before it is used. PSKs can be established in one TLS handshake and then used to establish a new connection in another handshake. The PSK corresponds to a unique key derived from the initial handshake or the PSK can be pre-configured on the VPN server.

One of the challenges with a PSK-based authentication method is the use of a global pre-shared key for all VPN clients. The same PSK is used on all devices for authentication. This poses a great security risk. All it may take is one device to be compromised for the PSK to become useless, or rather dangerous. Since VPN clients may run on a different host operating system (OS), there is a possibility that a global PSK can be verified on some of the operating systems by decompiling the binary or reverse engineering methods. A rogue user can take advantage of a PSK learned through these mechanisms to set up a rogue VPN server and perform a man-in-the-middle (MITM) attack.

A rogue VPN server can include a Dynamic Host Configuration Protocol (DHCP) server that impersonates a legitimate server and offers Internet Protocol (IP) addresses and network information to client devices (e.g., VPN clients) within a network. A rogue VPN server could be set up by an attacker and is not under the control of network administrators. In a MITM attack, which is a form of cyberattack, an attacker secretly relays and possibly alters the communications between two parties (e.g., VPN client and VPN server) who believe that they are directly communicating with each other, as the attacker inserts itself between two parties on a given network, for example, through a rogue VPN server. A rogue VPN server can redirect VPN clients' traffic to itself by responding as a legitimate VPN server. In this manner, a rogue user can get to know the user credentials of other users. Thus, this method of VPN connection establishment is susceptible to a MITM attack.

To address these technical challenges, the current disclosure provides a mechanism for a VPN client to verify the authenticity of IKE messages received from a VPN server during a VPN connection, which ensures that the VPN client is communicating with a legitimate VPN server. In some examples of the current disclosure, a VPN client sends a VPN server profile request message to a VPN server for establishing a VPN connection. The VPN server profile request message is sent during the first log-in by the VPN client to the VPN server. In response, the VPN server provides a VPN server profile to the VPN client. The VPN server profile comprises a cryptographic public key of a public-private key pair associated with a server certificate of the VPN server. The VPN server profile can include other parameters (e.g., a PSK) as well. The VPN client stores the VPN server profile.

The VPN client sends an Internet Key Exchange (IKE) message to the VPN server. As used herein, an "IKE message" refers to a message exchanged between a VPN client and a VPN server during Phase 1 or Phase 2 of IKE tunnel negotiation for establishing a VPN connection. In response to the IKE message, the VPN server sends a signed IKE response message, which is signed using a private key of the public-private key pair associated with the server certificate, to the VPN client. Upon receipt, the VPN client verifies the authenticity of the signed IKE response message. In some examples, to verify the authenticity, the VPN client retrieves, from the VPN server profile, the cryptographic public key of the public-private key pair associated with the server certificate. The VPN client then verifies the signed IKE response message using the cryptographic public key. If the signed IKE message is successfully verified, the VPN client sends an identity of the VPN client to the VPN server.

By successfully verifying the authenticity of the signed IKE response message from the VPN server, the VPN client ensures that it is communicating with a legitimate VPN server. As used herein, a "legitimate VPN server" refers to a VPN server that is authorized (for example, by a network administrator) to connect with a VPN client(s). A successful verification helps in averting a MITM attack even if a rogue user takes advantage of a global PSK learned through suspect means (e.g., by decompiling the binary or reverse engineering method) to set up a rogue VPN server. The VPN client first verifies the authenticity of the signed IKE response messages from the VPN server by using the cryptographic public key of the server certificate prior to sending an identity of the VPN client to the VPN server. If the VPN client is unsuccessful in verifying an IKE response message, the VPN client abstains from sending an identity of the VPN client to the VPN server. Since no credentials are sent by the VPN client, a connection with the VPN server, which could be a rogue VPN server, is not established. In this manner, the proposed examples help prevent a MITM attack in a pre-shared key-based IKE deployment.

Figure 1:
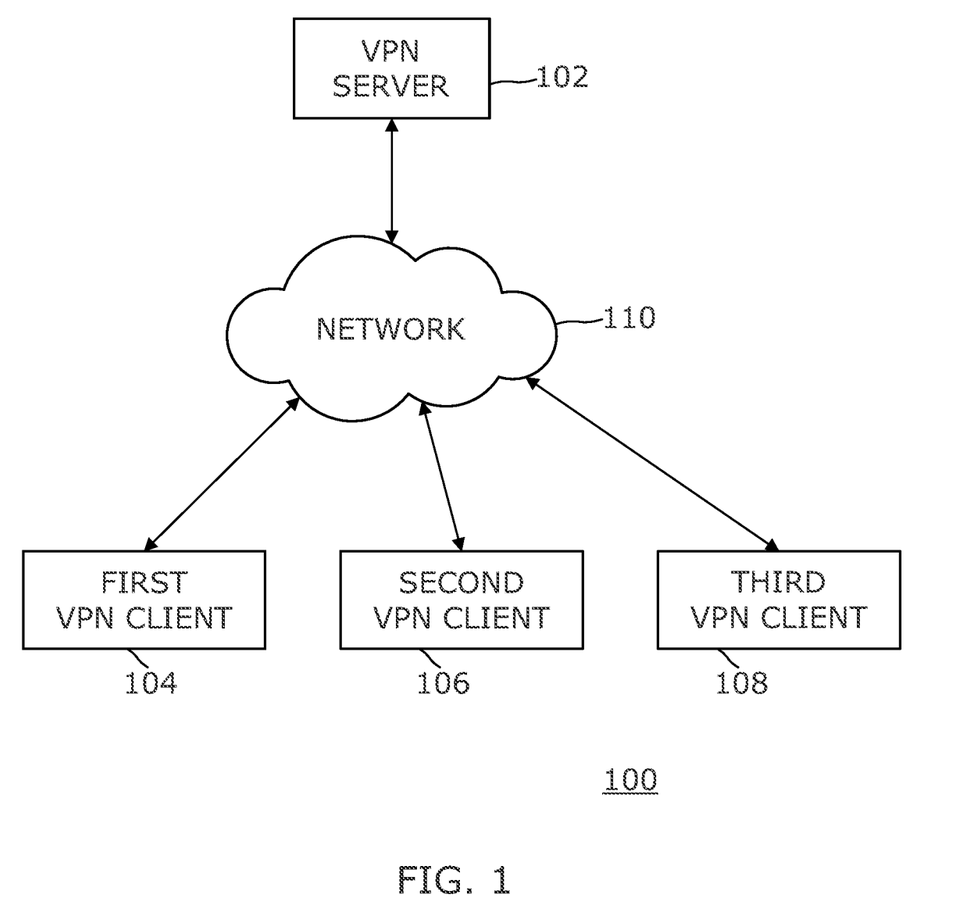
FIG. 1 is a block diagram of a computing environment for verifying the authenticity of Internet Key Exchange (IKE) exchange messages in a VPN, according to some examples.

Referring now to the figures, FIG. 1 is a block diagram of an example computing environment 100 that includes a VPN server 102, a first VPN client 104, a second VPN client 106, and a third VPN client 108. In the example of FIG. 1, three VPN clients (104, 106, and 108) are depicted for simplicity. In some examples, computing environment 100 may include a different number of VPN clients.

The first VPN client 104, the second VPN client 106, the third VPN client 108, and the VPN server 102 can be communicatively coupled over a network 110 such as a local area network (LAN), wide area network (WAN), a storage area network (SAN), a campus area network (CAN), the internet, or any other type of network. In some examples, the first VPN client 104, the second VPN client 106, the third VPN client 108, and the VPN server 102 can be located in different geographical locations.

The first VPN client 104 sends a request to the VPN server 102 to obtain a VPN server profile. The first VPN client 104 can send the request via a VPN profile request message during the first log-in by the first VPN client 104 to the VPN server 102. The request can be sent, for example, over an authenticated session (e.g., a TLS connection). In response to the request, the VPN server 102 provides the VPN server profile to the first VPN client 104. The VPN server profile can comprise a cryptographic public key of a public-private key pair associated with a server certificate of the VPN server and other parameters such as a PSK. The first VPN client 104 stores the VPN server profile. The first VPN client 104 then sends an IKE message to the VPN server 102 for establishing a VPN connection.

The first VPN client 104 can include an end device (e.g., a desktop computer, a notebook computer, a tablet computer, a thin client, or any other processing device) or software (machine-readable instructions) executing on a device that is seeking connection, network, or data services from a virtual private network.

In an example, the first VPN client 104 can be connected to the internet. When the first VPN client 104 wants to connect with the VPN server 102 for the first time to establish a VPN connection, the first VPN client 104 sends a VPN server profile request message to the VPN server 102 for obtaining the VPN server profile of the VPN server 102.

The VPN server profile request message can be sent to the VPN server 102 over an authenticated session. In an authenticated session, the VPN server 102 creates a session for the first VPN client 104 and uses a session ID to authenticate the first VPN client 104 during communication. In an example, the authenticated session includes a Transport Layer Security (TLS) connection. As used herein, "TLS" refers to a protocol that provides communication security between a client and a server that communicate with each other over a network, such as the internet. TLS enables privacy, integrity, and protection for the data that is transmitted between different nodes (e.g., VPN server 102 and first VPN client 104) on a network.

In response to receiving the VPN server profile request message, the VPN server 102 generates a VPN server profile. In an example, the VPN server profile comprises a cryptographic public key of a cryptographic public-private key pair associated with a server certificate of the VPN server 102 and a PSK generated by the VPN server 102 (or pre-configured at the VPN server 102).

As used herein, "server certificate" refers to a certificate used to authenticate the identity of a server (e.g., 102) to a client (e.g., 104). The server certificate of the VPN server 102 can include, for example, the VPN server's public key, the VPN server's name, the name of the CA that issued the certificate, the date from which the certificate is valid, the expiry date of the certificate, and/or a serial number that is a unique identifier assigned by the CA which issued the certificate. In an example, the server certificate of the VPN server 102 can be issued by a Certificate Authority (CA), which is an organization that is trusted to verify the identity and legitimacy of any entity requesting a certificate. A CA can accept certificate applications, authenticate applications, issue certificates, and maintain status information on certificates issued.

The server certificate protects against impersonation by certifying that a public key belongs to a specified entity (e.g., the VPN server 102). The server certificate binds a public key to its owner entity (e.g., VPN server 102). If public keys are sent directly by their owner to another entity, there is a risk that the message could be intercepted and the public key substituted by another. Therefore, a public key is exchanged through a trusted third party (e.g., CA), which provides an assurance that the public key belongs to the entity with which communication is occurring. Instead of sharing the public key directly, the trusted third party (e.g., CA) incorporates it into a digital certificate. In an example, the server certificate can include a Secure Sockets Layer (SSL) certificate. An SSL certificate can be used to authenticate the identity of the server (e.g., 102) and encrypt the data that's being transmitted. The encryption is based on public key infrastructure (PKI). The PKI is a system for the creation, storage, and distribution of digital certificates which are used to verify that a particular public key belongs to a certain entity. The PKI creates digital certificates (e.g., a server certificate) that map public keys to entities, securely stores these certificates in a central repository, and revokes them if needed. The CA certifies the ownership of a cryptographic public-private key pair.

The cryptographic public-private key pair can be generated based on public-key cryptography (or asymmetric cryptography) mechanism that uses pairs of related keys. Each key pair consists of a cryptographic public key and a corresponding cryptographic private key. Key pairs are generated with cryptographic algorithms. The security of public-key cryptography depends on keeping the private key secret. The cryptographic public key can be openly distributed without compromising security. Anyone with a cryptographic public key can encrypt a message, yielding a cipher text (i.e. encrypted text transformed from plaintext), but only those who know the corresponding cryptographic private key can verify the cipher text to obtain the original message. The VPN server 102 includes the cryptographic public key associated with the server certificate of the VPN server 102 in the VPN server profile.

As mentioned earlier, the VPN server profile can also include a PSK. In an example, the VPN server 102 can generate the PSK. As used herein, a "pre-shared key (PSK)" is a secret string of characters in cryptography that is shared between two parties via a secure channel before the PSK is used. The PSK can be a random number of a pre-defined length (e.g., 256 bytes). The pre-defined length could be defined, for example, by a user, the VPN server 102, or another device.

The VPN server 102 sends the VPN server profile to the first VPN client 104. The VPN server profile can comprise the cryptographic public key of the VPN server 102 and a PSK. The VPN server profile can also comprise the server certificate that includes the server name and the name of CA that vouches for the authenticity of the certificate. The VPN server profile can be sent over an authenticated connection to the first VPN client 104. In an example, the authenticated connection is a TLS connection.

The first VPN client 104 receives the VPN server profile from the VPN server 102 and stores the VPN server profile in storage. The "storage" can include a memory device, a solid-state drive, disk-based storage, or any other device capable of storing data. In some examples, the first VPN client 104 can receive the VPN server profile one time from the VPN server 102. As mentioned earlier, the first VPN client 104 can receive the VPN server profile during the first log-in to the VPN server 102. The first VPN client 104 can use (or reuse) the stored VPN server profile for establishing a VPN connection with the VPN server 102. The first VPN client 104 can begin establishing a VPN connection with the VPN server 102 immediately after receiving the VPN server profile or at a later point in time.

To establish a secure VPN connection with the VPN server 102, the first VPN client 104 sends an Internet Key Exchange (IKE) message (e.g., IKE_SA_INIT) to the VPN server 102. As used herein, "Internet Key Exchange (IKE)" refers to a key management protocol used for exchanging keys for encryption and authentication over an unsecured medium, such as the internet. IKE can be used in conjunction with an Internet Protocol Security (IPsec) standard protocol and provides security for virtual private networks (VPNs) negotiations and network access to random hosts. IKE provides tunnel management for IPsec and authenticates end entities. The IPsec tunnels generated by IKE are used to encrypt, decrypt, and authenticate user traffic between network devices (e.g., first VPN client 104 and VPN server 102).

IKE protocol is used to set up a security association (SA) in the IPsec protocol suite. A SA specifies security properties that are recognized by communicating devices (e.g., first VPN client 104 and VPN server 102). A SA is a relationship between two or more entities (e.g., first VPN client 104 and VPN server 102) that describes how the entities will use security services to communicate securely. The SA contains all the information required for the two peers (e.g., first VPN client 104 and VPN server 102) to exchange data securely.

As used herein, "Internet Protocol security (IPsec)" refers to a secure network protocol suite that authenticates and encrypts packets of data to provide secure encrypted communication between two computers over an Internet Protocol network. As used herein, "IPsec tunnel" refers to an IPsec connection between two participating entities (e.g., a VPN server 102 and a first VPN client 104) in a VPN to secure communication between them.

Communication between the first VPN client 104 and the VPN server 102 can begin with IKE_SA_INIT exchanges. The first pair of messages (IKE_SA_INIT) negotiate cryptographic algorithms, exchange nonce (e.g., an arbitrary number that can be used just once in a cryptographic communication), and perform a key exchange such as a Diffie-Hellman exchange [DH].

IKE protocol has two versions—"IKEv1" and "IKEv2". The operation of IKEv1 can be broken down into two phases. 1) Phase 1 (IKE SA Negotiation) and 2) Phase 2 (IPSec SA Negotiation). IKEv1 Phase 1 SA negotiation is for protecting IKE. IKEv1 Phase 2 SA negotiation is for protecting IPSec.

IKEv1 Phase 1 negotiation can happen in two modes—Main mode or Aggressive mode. IKEv1 Phase 1 Main mode has three pairs of messages (total six messages) between IPSec peers (e.g., first VPN client 104 and VPN server 102). IKE Phase 1 Aggressive Mode has three message exchanges. The aim of IKEv1 Phase 1 is to establish IKE SA. IKEv1 Phase 2 has three messages. The aim of IKEv1 Phase 2 is to establish IPSec SA.

The IKE message sent by the first VPN client 104 to the VPN server 102 can include an IKEv1 Phase 1 message or an IKEv2 Phase message. The VPN server 102 receives the IKE message (e.g., IKE_SA_INIT packet) from the first VPN client 104. In response to the IKE message, the VPN server 102 creates a signed IKE response message. The signed IKE response message can be encrypted or unencrypted. As used herein, "encryption" refers to the process of using an algorithm to transform information into a code to make the code unreadable to unauthorized users. Once the information is encoded, the information requires verification ion to be understood. The IKE response message is signed using the private key of the public-private key pair associated with the server certificate. The signed IKE response message can include an IKEv1 Phase 1 message or an IKEv2 Phase message depending on the phase under negotiation.

The VPN server 102 sends the signed IKE response message to the first VPN client 104, for example, over a TLS connection. Upon receipt of the signed IKE response message, the first VPN client 104 verifies the authenticity of the signed IKE response message received from the VPN server 102. In some examples, to verify the authenticity of the signed IKE response message, the first VPN client 104 retrieves the cryptographic public key associated with the VPN server certificate from the VPN server profile. The first VPN client 104 then uses the cryptographic public key to verify the signed IKE response message. As used herein, "decryption" refers to a process of transforming information that has been rendered unreadable through encryption back to its unencrypted form. During encryption the VPN server 102 can encrypt a message (e.g., IKE response message) using the VPN server's private key to create a cipher text. If the VPN client 104 decrypts the cipher text using the VPN server's cryptographic public key, the message verification is deemed successful. On the other hand, if the VPN client 104 fails to verify the cipher text using the public key of the VPN server 102, the message verification is deemed unsuccessful.

In response to successfully verifying the signed IKE response message, the first VPN client 104 sends an identity of the first VPN client 104 to the VPN server 102. In some examples, the first VPN client 104 sends the identity of the first VPN client 104 to the VPN server 102 in the form of IKE_SA_INIT payloads. Examples of the identity of the first VPN client 104 can include a media access control (MAC) address of the first VPN client 104, a user name provided through the first VPN client 104, or a string of characters (e.g., alphabets, numerals, alphanumeric, or any other character) assigned to the first VPN client 104. As used herein, "media access control address (MAC address)" refers to a unique identifier assigned to a network interface controller (NIC) for use as a network address in communications within a network segment. The user name could be provided, for example, by a user of the first VPN client 104, a system/network administrator, the first VPN client 104, or any other device. The string of characters could be assigned, for example, by a system/network administrator, the first VPN client 104, or any other device. In an example, a user of the first VPN client 104 may use XAuth protocol to provide credentials (e.g., user name and password) to the VPN server 102. XAuth protocol is used for the authentication of the individuals themselves. XAuth protocol can provide an additional level of authentication by forcing users of the first VPN client 104 to respond with their credentials before being allowed access to the VPN sever 102.

Successful verification of the authenticity of the signed IKE response message from the VPN server 102 ensures that the first VPN client 104 is communicating with a legitimate VPN server (e.g., VPN server 102). Even if a rogue user takes advantage of a PSK learned through suspect means (e.g., by decompiling the binary or reverse engineering method) to set up a rogue VPN server, a MITM attack could be averted since the first VPN client 104 would first verify the authenticity of the signed IKE response messages from the VPN server 102 by using the cryptographic public key of the server certificate. The first VPN client 104 sends an identity of the first VPN client 104 to the VPN server 102 for establishing a VPN connection, in response to the successful verification ion of IKE response messages.

In response to receiving the identity of the first VPN client 104, the VPN server 102 establishes a VPN connection with the first VPN client 104. In some examples, establishing a VPN connection includes establishing an IPsec VPN tunnel between the first VPN client 104 and the VPN server 102. An IPsec VPN tunnel consists of tunnel setup and applied security. During tunnel setup, the peers (e.g., first VPN client 104 and VPN server 102) establish security associations, as described earlier. After the tunnel is established, IPsec protects the traffic sent between the two tunnel endpoints (e.g., between first VPN client 104 and VPN server 102) by applying the security parameters defined by the SAs during tunnel setup.

If the first VPN client 104 is unsuccessful in verifying the signed IKE response message by using the cryptographic public key of the VPN server 102, the first VPN client 104 abstains from sending an identity of the first VPN client 104 to the VPN server 102. Since no credentials are sent by the first VPN client 104, a connection with the VPN server 102, which could be a rogue VPN server, is not established. In this manner, the proposed examples help prevent a MITM attack in a pre-shared key-based IKE deployment.

Figure 2:
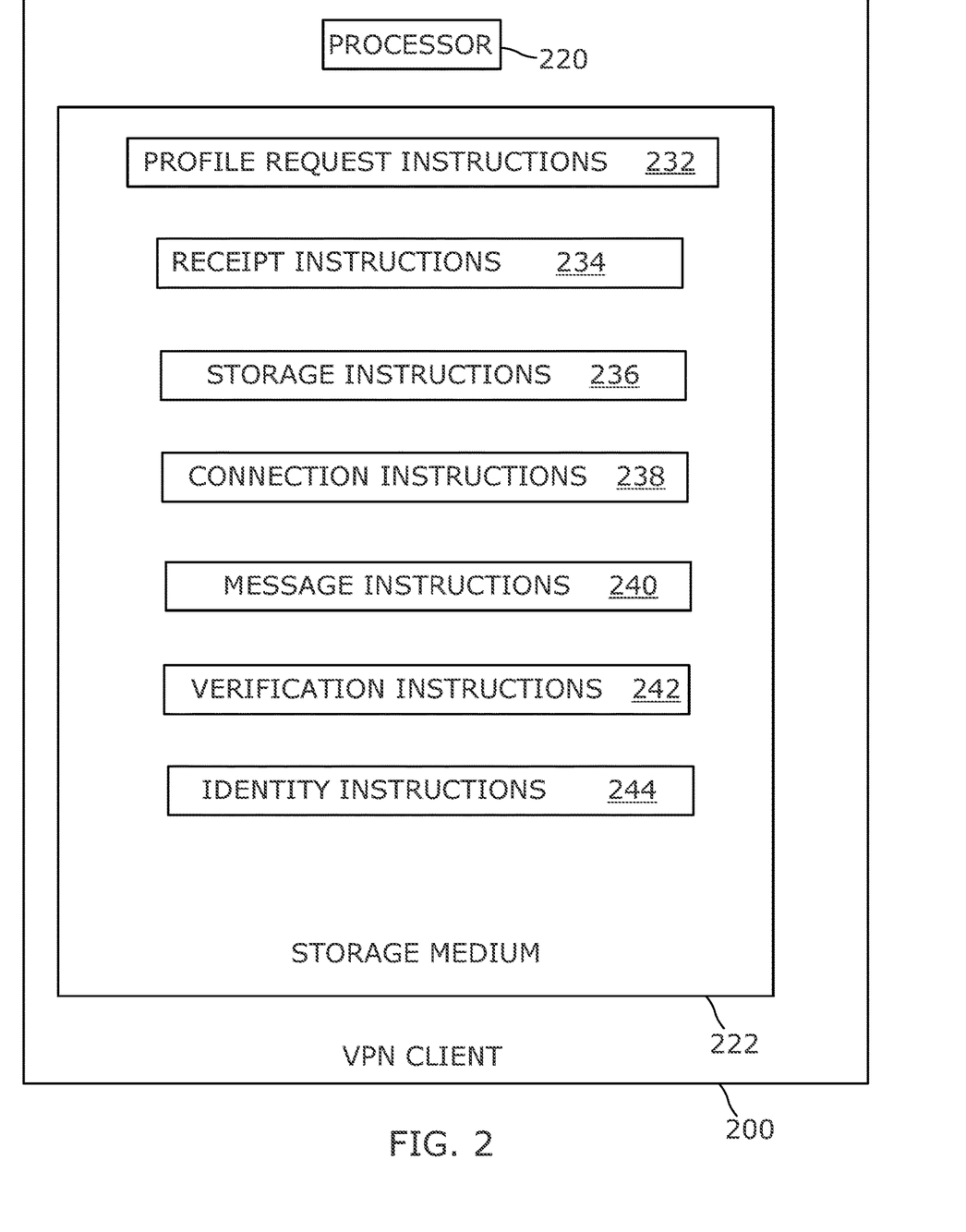
FIG. 2 illustrates a VPN client, according to some examples.

FIG. 2 illustrates a VPN client 200 of the computing environment of FIG. 1, according to some examples. The VPN client 200 can be analogous to the VPN client 104 of FIG. 1, in which like reference numerals correspond to the same or similar, though perhaps not identical, and components. For the sake of brevity, components or reference numerals of FIG. 2 having the same or similarly described function in FIG. 1 are not being described in connection with FIG. 2. Said components or reference numerals may be considered alike.

The VPN client 200 can include a processor 220 (or multiple processors) and a storage medium 222. The processor 220 can include a Central Processing Unit (CPU), a microprocessor, a programmable gate array, a microcontroller, or any other processing logic that interprets and executes machine-readable instructions stored in storage medium 222.

The storage medium 222 can store information and machine-readable instructions executable on the processor 220 to perform various tasks. The storage medium 222 can be Synchronous DRAM (SDRAM), Double Data Rate (DDR), Rambus DRAM (RDRAM), Rambus RAM, etc., or storage memory media such as a floppy disk, a hard disk, a CD-ROM, a DVD, a pen drive, and the like.

When the VPN client 200 wants to connect with a VPN server for the first time to establish a VPN connection, processor 220 executes profile request instructions 232 to send a VPN server profile request message to the VPN server. In an example, the VPN server profile request message can be sent through a browser-based Hypertext Transfer Protocol Secure (HTTPS) connection. The VPN server profile request message can be sent to the VPN server over a network such as a LAN, a WAN, a SAN, the internet, or any other type of network.

In response to receiving the VPN server profile request message, the VPN server generates a VPN server profile. In an example, the VPN server profile comprises a cryptographic public key of a cryptographic public-private key pair associated with a server certificate of the VPN server and a PSK generated by the VPN server (or pre-configured at the VPN server).

In some examples, the VPN server can use jitter entropy to generate a random number for use as PSK. As used herein, "jitter" refers to any deviation in, or displacement of, the signal pulses in a high-frequency digital signal. The deviation can be in terms of amplitude, phase timing, or the width of the signal pulse. As used herein, "jitter entropy" refers to an entropy source based on the central processing unit (CPU) execution time jitter. Many different factors can impact the amount of time it takes to execute the same set of instructions on a CPU. If one measures the execution time multiple times, it will show variation i.e. jitter. Since it is difficult to predict this jitter, the jitter could be used as an entropy source.

The VPN server sends the VPN server profile to the VPN client 200. The VPN server profile can comprise the cryptographic public key of the VPN server and a PSK. The VPN server profile is sent over an authenticated connection to the VPN client 200. In an example, the authenticated connection is a TLS connection. In some examples, the VPN server profile is sent one time to the VPN client 200.

Processor 220 executes receipt instructions 234 to receive the VPN server profile from the VPN server. Processor 220 executes storage instructions 236 to store the VPN server profile in storage. Processor 220 executes connection instructions 238 to send an IKE message to the VPN server for establishing a secure VPN connection with the VPN server.

The IKE message sent by VPN client 200 to the VPN server can include an IKEv1 Phase 1 message or IKEv2 Phase message. The VPN server receives the IKE message (e.g., IKE_SA_INIT packet) from the VPN client 200, for example, over a TLS connection. In response to the IKE message, the VPN server creates a signed IKE response message. The IKE response message is signed using the private key of the public-private key pair associated with server certificate. The signed IKE response message can include an IKEv1 Phase 1 message or IKEv2 Phase message depending on the phase under negotiation.

The VPN server sends the signed IKE response message to the VPN client 200, for example, over a TLS connection. Processor 220 executes response message instructions 240 to receive the signed IKE response message from the VPN server. Processor 220 executes verification instructions 242 to verify the authenticity of the signed IKE response message received from the VPN server. In some examples, to verify the authenticity of the signed IKE response message, processor 220 executes verification instructions 242 to retrieve the cryptographic public key of the VPN server certificate from the VPN server profile. Processor 220 then executes verification instructions 242 to use the cryptographic public key to verify the signed IKE response message.

In response to successfully verifying the signed IKE response message, processor 220 executes identity instructions 244 to send an identity of the VPN client 200 to the VPN server. In some examples, the VPN client 200 sends the identity of the VPN client 200 to the VPN server in the form of IKE_SA_INIT payloads. Examples of the identity of the VPN client 200 can include a media access control (MAC) address of the VPN client 200, a user name provided through the VPN client 200, or a string of characters (e.g., alphabets, numerals, alphanumeric, or any other character) assigned to the VPN client 200.

In response to receiving the identity of the VPN client 200, the VPN server establishes a VPN connection with the VPN client 200. In some examples, establishing a VPN connection includes establishing an IPsec VPN tunnel between the VPN client 200 and the VPN server.

Figure 3:
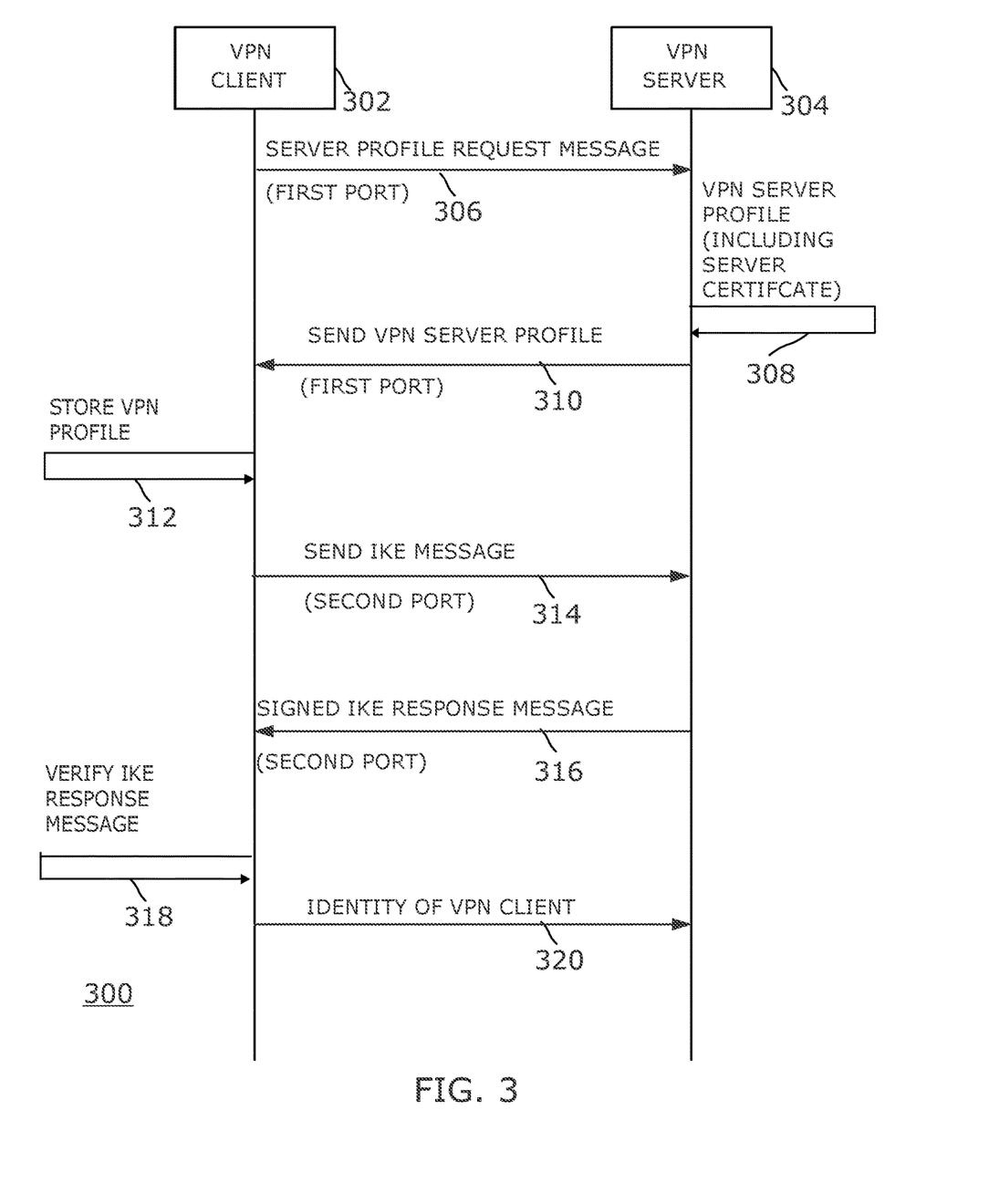
FIG. 3 is a block diagram of a communication flow, according to some examples.

FIG. 3 is a block diagram of a communication flow 300, according to some examples. In FIG. 3, a VPN client 302 can be connected to the internet.

When the VPN client 302 wants to connect with a VPN server 304 for the first time to establish a VPN connection, the VPN client 302 sends a VPN server profile request message 306 to the VPN server 304. The VPN server profile request message 306 can be sent to the VPN server 304 over an authenticated session (e.g., TLS).

In some examples, the VPN client 302 is software (machine-readable instructions) that can establish a secure connection between a user and a VPN server 304. In some examples, the VPN client 302 can work in the background automatically, while in other examples the VPN client 302 can have a user interface that allows a user to interact with and configure the VPN client 302.

In an example, the user interface of the VPN client 302 can allow a user to simply click on a component (e.g., a button or icon) of the user interface to initiate a VPN connection with a VPN server 304. The user interface can also allow a user to view configuration parameters of the VPN client 302 such as SSID name, connection type (e.g., wireless or wired), connection speed, assigned IP address, remote VPN server address, number of VPN packets sent or received, log files (e.g., including last successful login details). In some examples, the user interface of the VPN client 302 can allow a user to select a VPN server of choice for establishing a VPN connection from several VPN server options.

In response to receiving the VPN server profile request message 306, the VPN server 304 generates a VPN server profile 308. In an example, the VPN server profile 308 comprises a cryptographic public key of a cryptographic public-private key pair associated with a server certificate of the VPN server 304 and a PSK generated by the VPN server 304.

The VPN server 304 sends the VPN server profile 310 to the VPN client 302. The VPN server profile 308 can comprise the cryptographic public key of the VPN server and a PSK. The VPN server profile 308 is sent over an authenticated connection to the VPN client 302. In an example, the authenticated connection is a TLS connection. The VPN server profile request message 306 and the VPN server profile 308 can be exchanged over a first port on the VPN client 302. In some examples, the first port includes port 443.

The VPN client 302 receives the VPN server profile 308 from the VPN server 304 and stores 312 the VPN server profile 308 in storage. Now, to establish a secure VPN connection with the VPN server 304, the VPN client 302 sends an IKE message 314 to the VPN server 304.

The IKE message sent by the VPN client 302 to the VPN server 304 can include an IKEv1 Phase 1 message or an IKEv2 Phase message. The VPN server 304 receives the IKE message (e.g., IKE_SA_INIT packet) from the VPN client 302, for example, over a TLS connection. In response to the IKE message, the VPN server 304 creates a signed IKE response message. The IKE response message is signed using the private key of the public-private key pair associated with the server certificate. The signed IKE response message can include an IKEv1 Phase 1 message or an IKEv2 Phase message depending on the phase under negotiation.

The VPN server 304 sends the signed IKE response message 316 to the VPN client 302, for example, over a TLS connection. The VPN client 302 receives the signed IKE response message from the VPN server 304. The IKE message and the signed IKE response message can be exchanged over a second port on the VPN client 302. In some examples, the second port includes port 4500 or port 500.

The VPN client 302 proceeds to verify the authenticity of the signed IKE response message received from the VPN server 304. To verify the authenticity of the signed IKE response message, the VPN client 302 retrieves the cryptographic public key of the VPN server certificate from the VPN server profile and uses the cryptographic public key to verify the signed IKE response message 318. Any additional signed IKE response messages received from the VPN server 304 are verified similarly by the VPN client 302. The VPN client 302 verifies the authenticity of each of the additional signed IKE response messages by verifying each of the additional messages using the cryptographic public key of the VPN server 304.

If the signed IKE response message is successfully verified, the VPN client 302 sends an identity of the VPN client 302 to the VPN server 304. In some examples, the VPN client 302 sends the identity of the VPN client 320 to the VPN server in the form of IKE_SA_INIT payloads.

In response to receiving the identity of the VPN client 302, the VPN server establishes a VPN connection with the VPN client 302. In some examples, establishing a VPN connection includes establishing an IPsec VPN tunnel between the VPN client 302 and the VPN server 304.

Figure 4:
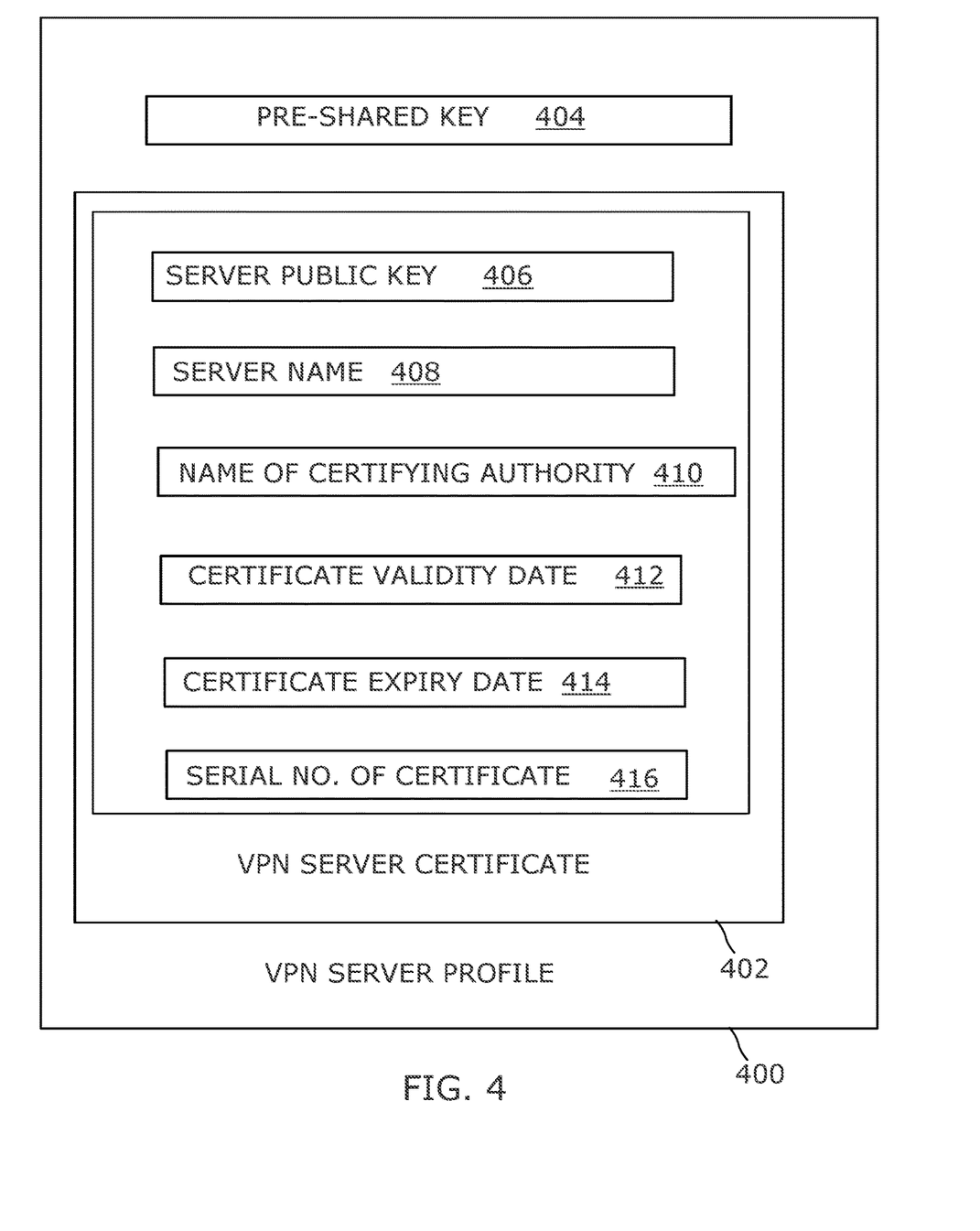
FIG. 4 illustrates a server profile, according to some examples.

FIG. 4 illustrates a VPN server profile 400, according to some examples. The VPN server profile 400 comprises a cryptographic public key of a cryptographic public-private key pair associated with a server certificate 402 of a VPN server and a PSK 404 generated by the VPN server (or pre-configured at the VPN server).

The server certificate 402 is used to authenticate the identity of a server to a client. The server certificate of the VPN server can include, for example, the VPN server's public key 406, the VPN server's name 408, the name of the certifying authority that issued the certificate 410, the date from which the certificate is valid 412, the expiry date of the certificate 414, and/or a serial number 416 that is a unique identifier assigned by the certifying authority which issued the certificate. The certifying authority is an organization that is trusted to verify the identity and legitimacy of any entity requesting a certificate. The certifying authority can accept certificate applications, authenticate applications, issue certificates, and maintain status information on certificates issued.

Figure 5:
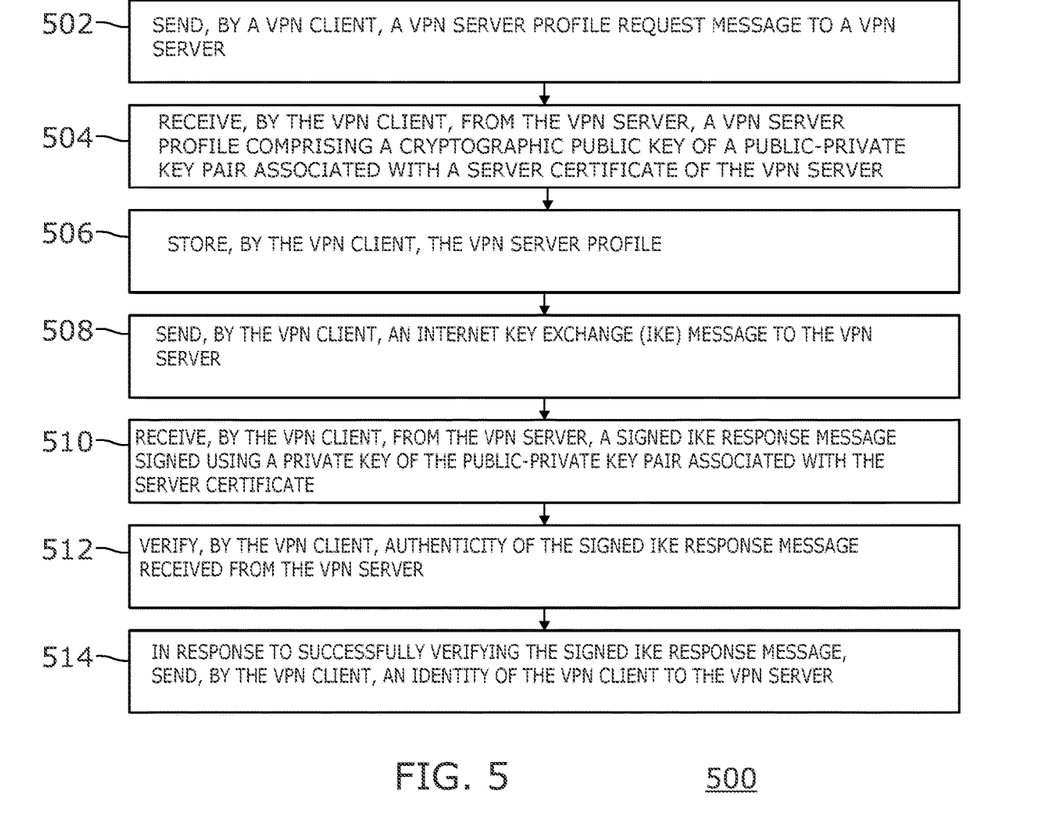
FIG. 5 is a flowchart of a method, according to some examples.

FIG. 5 is a flowchart of method 500, according to some examples. Method 500 can be performed by a system including a processor, where the system can include a computer or multiple computers. For example, method 500 can at least partially be executed on the VPN client 104 of FIG. 1 or the VPN client 200 of FIG. 2.

At block 502, method 500 includes sending, by a VPN client, a server profile request message to a VPN server. The VPN server profile request message can be sent to the VPN server, for example, over a TLS connection. In an example, the server profile request message is sent as part of the TLS handshake. The TLS handshake is an initial negotiation between the VPN client and the VPN server that establishes the parameters of their subsequent interactions within TLS.

In response to receiving the VPN server profile request message, the VPN server generates a VPN server profile. In an example, the VPN server profile comprises a cryptographic public key of a cryptographic public-private key pair associated with a server certificate of the VPN server and a PSK generated by the VPN server.

The VPN server sends the VPN server profile to the VPN client. The VPN server profile can comprise the cryptographic public key of the VPN server and a PSK. The PSK can be a string of 64 hexadecimal digits or a passphrase of 8 to 63 printable American Standard Code for Information Interchange (ASCII) characters. In an example, Temporal Key Integrity Protocol (TKIP) can be used to generate a PSK for the VPN client based on, for example, the passphrase and the network SSID. TKIP is a security protocol used in the IEEE 802.11 wireless networking standard. When the VPN client attempts to connect with the VPN server, the PSK provided by the VPN client is used to verify whether to allow the VPN client access to the VPN server. If the VPN client PSK matches with the PSK on the VPN server, the VPN client is granted access to the VPN server. If the PSKs are different, then the authentication will not be successful and access to the VPN server is not granted. In some examples, the PSK is a shared PSK that is provided to other VPN clients that log in to the VPN server.

The VPN server profile is sent over an authenticated connection to the VPN client. In an example, the authenticated connection is a TLS connection. At block 504, method 500 includes receiving, by the VPN client, the VPN server profile from the VPN server. In an example, the VPN server profile is received over a TLS connection. At block 506, the method includes storing, by the VPN client, the VPN server profile in storage. The storage can include storing the cryptographic public key of the VPN server and the PSK generated by the VPN server in, for example, a memory device, a solid-state drive, disk-based storage, or any other device capable of storing data.

At block 508, method 500 includes sending, by the VPN client, an IKE message to the VPN server for establishing a secure VPN connection with the VPN server. The IKE message can be sent over an authenticated connection to the VPN server. In an example, the authenticated connection is a TLS connection.

The IKE message sent by the VPN client to the VPN server can include an IKEv1 Phase 1 message or an IKEv2 Phase message. In some examples, the IKE message is an IKE tunnel negotiation message. The VPN server receives the IKE message (e.g., IKE_SA_INIT packet) from the VPN client, for example, over a TLS connection. In response to the IKE message, the VPN server creates a signed IKE response message. The IKE response message is signed using the private key of the public-private key pair associated with the server certificate. The signed IKE response message can include an IKEv1 Phase 1 message or an IKEv2 Phase message depending on the phase under negotiation.

The VPN server sends the signed IKE response message to the VPN client, for example, over a TLS connection. At block 510, the method includes receiving, by the VPN client, the signed IKE response message from the VPN server. At block 512, the method includes verifying, by the VPN client, the authenticity of the signed IKE response message received from the VPN server. To verify the authenticity of the signed IKE response message, the VPN client retrieves the cryptographic public key of the VPN server certificate from the VPN server profile. The VPN client then uses the cryptographic public key to verify the signed IKE response message. During encryption the VPN server can encrypt a message (e.g., IKE response message) using the VPN server's private key to create a cipher text. If the VPN client verifies the cipher text using the VPN server's cryptographic public key, the message verification is deemed successful. On the other hand, if the VPN client fails to verify the cipher text using the public key of the VPN server, the message verification is deemed unsuccessful.

At block 514, the method includes, sending, by the VPN client, an identity of the VPN client to the VPN server, if the signed IKE response message is successfully verified. In some examples, the VPN client sends the identity of the VPN client to the VPN server in the form of IKE_SA_INIT payloads.

In response to receiving the identity of the VPN client, the VPN server establishes a VPN connection with the VPN client. In some examples, establishing a VPN connection includes establishing an IPsec VPN tunnel between the VPN client and the VPN server.

Figure 6:
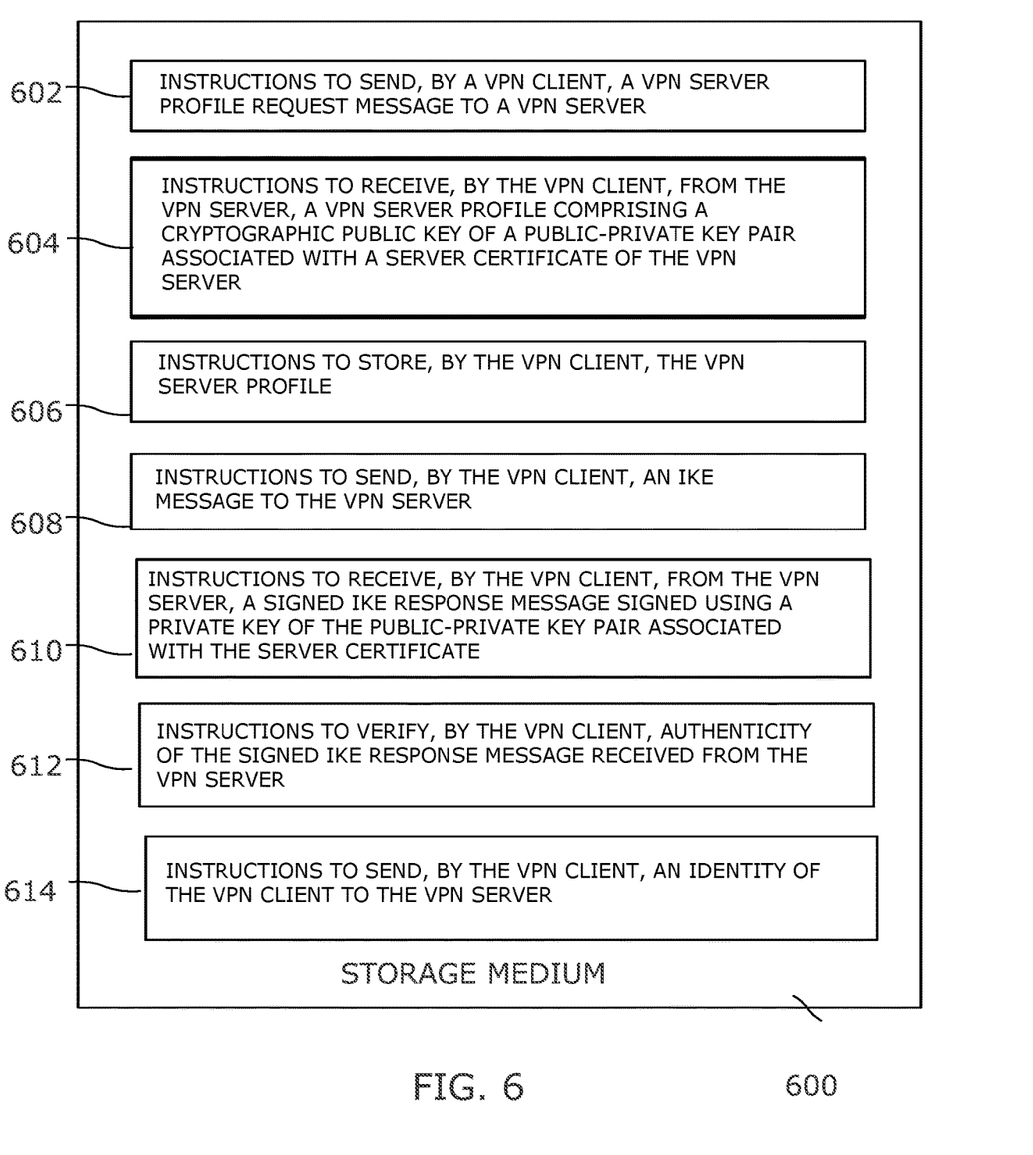
FIG. 6 is a block diagram of a storage medium storing machine-readable instructions, according to some examples.

FIG. 6 is a block diagram of a non-transitory machine-readable or computer-readable storage medium 600 storing machine-readable instructions that upon execution cause a system to perform various tasks. The system can include a computer (e.g., a VPN client) or a collection of computers.

The machine-readable instructions include instructions 602 on a computer (e.g., a VPN client) to send a VPN server profile request message to a VPN server during the first log-in by the VPN client to the VPN server. In response to the VPN server profile request message, the machine-readable instructions include instructions 604 to receive from the VPN server, a VPN server profile comprising a cryptographic public key of a public-private key pair associated with a server certificate of the VPN server.

The machine-readable instructions 606 include instructions to store the VPN server profile. The machine-readable instructions include instructions 608 to send an Internet Key Exchange (IKE) message to the VPN server. In response to the IKE message, the machine-readable instructions 610 to receive from the VPN server, a signed IKE response message signed using a private key of the public-private key pair associated with the server certificate.

The machine-readable instructions 612 to verify the authenticity of the signed IKE response message received from the VPN server, wherein to verify comprises. The machine-readable instructions 612 include instructions to retrieve from the VPN server profile, the cryptographic public key of the public-private key pair associated with the server certificate. The machine-readable instructions 612 include instructions to verify the signed IKE response message using the cryptographic public key. In response to successful decryption of the signed IKE response message, the machine-readable instructions include instructions 614 to send an identity of the VPN client to the VPN server.

For simplicity of explanation, the example method of FIG. 5 is shown as executing serially, however, it is to be understood and appreciated that the present and other examples are not limited by the illustrated order. The example systems of FIGS. 1, 2, 3, 4, and 6, and the method of FIG. 5 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general-purpose or special-purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general-purpose or special-purpose computer. The computer-readable instructions can also be accessed from memory and executed by a processor.

It should be understood that the above-described examples of the present solution are for illustration only. Although the solution has been described in conjunction with a specific example thereof, numerous modifications may be possible without materially departing from the teachings and advantages of the subject matter described herein. Other substitutions, modifications, and changes may be made without departing from the spirit of the present solution. All of the features disclosed in this specification (including any accompanying claims, abstract, and drawings), and/or all of the steps of any method or process so disclosed, may be combined in any combination, except combinations where at least some of such features and/or steps are mutually exclusive.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

As used herein, the articles "a" and "an" are intended to include one or more items and may be used interchangeably with "one or more." Further, as used herein, the article "the" is intended to include one or more items referenced in connection with the article "the" and may be used interchangeably with "the one or more." Also, as used herein, the terms "has," "have," "having," or the like are intended to be open-ended terms. As used herein, the term "includes" is intended to mean "includes but not limited to", and the term "including" is intended to mean "including but not limited to". Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The invention claimed is:

1. A method comprising:
   sending, by a virtual private network (VPN) client, a VPN server profile request message to a VPN server during a first log in by the VPN client to the VPN server;
   in response to the VPN server profile request message, receiving, by the VPN client, from the VPN server, a VPN server profile comprising a public key of a public-private key pair associated with a server certificate of the VPN server;
   storing, by the VPN client, the VPN server profile;
   sending, by the VPN client, an Internet Key Exchange (IKE) message to the VPN server;
   in response to the IKE message, receiving, by the VPN client, from the VPN server, a signed IKE response message signed using a private key of the public-private key pair associated with the server certificate;
   verifying, by the VPN client, authenticity of the signed IKE response message received from the VPN server, wherein verifying comprises:
      retrieving, by the VPN client, from the VPN server profile, the public key of the public-private key pair associated with the server certificate; and
      verifying, by the VPN client, the signed IKE response message using the public key; and
   in response to successfully verifying the signed IKE response message, sending, by the VPN client, an identity of the VPN client to the VPN server.

2. The method of claim 1, further comprising:
   establishing, by the VPN client, a VPN connection with the VPN server.

3. The method of claim 2, wherein establishing the VPN connection comprises creating an Internet Protocol Security (IPsec) tunnel between the VPN client and the VPN server.

4. The method of claim 1, further comprising:
   receiving, by the VPN client, from the VPN server, additional signed IKE response messages signed using the private key of the public-private key pair associated with the server certificate; and
   verifying, by the VPN client, authenticity of each of the additional signed IKE response messages comprising:
      retrieving, by the VPN client, from the VPN server profile, the public key of the public-private key pair associated with the server certificate; and
      verifying, by the VPN client, each of the additional signed IKE response messages using the public key.

5. The method of claim 1, further comprising:
   in response to unsuccessfully verifying the signed IKE response message, abstaining, by the VPN client, to send an identity of the VPN client to the VPN server.

6. The method of claim 1, wherein the VPN server profile is received one time from the VPN server.

7. The method of claim 1, wherein:
the VPN server profile request message and the VPN server profile are exchanged over a first port on the VPN client; and
the IKE message and the signed IKE response message are exchanged over a second port on the VPN client.

8. The method of claim 1, wherein the VPN server profile comprises a pre-shared key (PSK).

9. The method of claim 8, wherein the PSK is a shared PSK that is provided to other VPN clients that log in to the VPN server.

10. The method of claim 1, wherein the VPN server profile request is sent over an authenticated connection.

11. The method of claim 10, wherein the authenticated connection is a Transport Layer Security (TLS) connection.

12. A non-transitory machine-readable storage medium comprising instructions that upon execution cause a virtual private network (VPN) client to:
send a VPN server profile request message to a VPN server during a first log in by the VPN client to the VPN server;
in response to the VPN server profile request message, receive from the VPN server, a VPN server profile comprising a public key of a public-private key pair associated with a server certificate of the VPN server;
store the VPN server profile;
send an Internet Key Exchange (IKE) message to the VPN server;
in response to the IKE message, receive from the VPN server, a signed IKE response message signed using a private key of the public-private key pair associated with the server certificate;
verify authenticity of the signed IKE response message received from the VPN server, wherein to verify comprises:
retrieve from the VPN server profile, the public key of the public-private key pair associated with the server certificate; and
verify the signed IKE response message using the public key; and
in response to a successful verification of the signed IKE response message, send an identity of the VPN client to the VPN server.

13. The non-transitory machine-readable storage medium of claim 12, wherein the IKE message is an IKE tunnel negotiation message.

14. The non-transitory machine-readable storage medium of claim 12, wherein the VPN server profile is received over an authenticated connection.

15. The non-transitory machine-readable storage medium of claim 14, wherein the authenticated connection is a Transport Layer Security (TLS) connection.

16. The non-transitory machine-readable storage medium of claim 12, wherein the identity of the VPN client comprises a media access control (MAC) address of the VPN client.

17. The non-transitory machine-readable storage medium of claim 12, wherein the identity of the VPN client comprises a user name provided through the VPN client.

18. The non-transitory machine-readable storage medium of claim 12, wherein the identity of the VPN client comprises a string of characters assigned to the VPN client.

19. The non-transitory machine-readable storage medium of claim 12, further comprising instructions to establish an IPsec tunnel between the VPN client and the VPN server.

* * * * *